United States Patent Office 3,226,408
Patented Dec. 28, 1965

3,226,408
PREPARATION OF TETRAMETHYLLEAD AND
CATALYST THEREFOR
Francis M. Beaird, Jr., and Paul Kobetz, Baton Rouge,
La., assignors to Ethyl Corporation, New York, N.Y.,
a corporation of Virginia
No Drawing. Filed June 6, 1963, Ser. No. 285,855
13 Claims. (Cl. 260—437)

This invention relates to a new and improved process for the synthesis of a tetramethyllead product, and a catalyst system therefor.

It is known that the tetraalkyllead compounds can be made, generally, by the reaction of an alkali metal lead alloy and an alkyl halide, such as a mono sodium lead alloy, NaPb, and an alkyl chloride. The reaction for tetraethyllead is $$4NaPb + 4C_2H_5Cl \rightarrow (C_2H_5)_4Pb + 3Pb + 4NaCl$$

This type of synthesis reaction has been employed for an appreciable period for making large amounts of tetraethyllead. The chemical reaction is operative for other tetraalkylleads, and recently considerable interest has developed in the manufacture and use of tetramethyllead, which is an appreciably more volatile lead antiknock compound.

The indicated chemical reaction, applied to the manufacture of tetramethyllead is operative, but only very low yields are obtained without a catalyst. Also, a tetramethyllead process presents much more drastic control requirements, and requires more rigorous control than the corresponding type of synthesis of tetraethyllead, because of the substantially higher vapor pressure of tetramethyllead and of the methyl chloride used in its synthesis. A substantially improved procedure for the synthesis of tetramethyllead is disclosed in U.S. Patent 3,049,558 by Cook et al. According to the Cook et al. process, a controlled quantity of a class of inert liquid hydrocarbons, provides, in the presence of a catalyst, appreciably greater yields than are achieved when no inert hydrocarbon is present. The hydrocarbons generally are those having an atmospheric boiling point of about 90–150° C. and these are employed in relatively small concentrations based on the lead in the alloy charged. Aluminum type catalysts are highly effective catalysts.

According to the Cook et al. process, yields of the order of 60–75 percent can be obtained, in reaction periods of less than about seven hours.

A problem encountered in tetramethyllead synthesis is frequent difficulty in discharge of reaction mass from commercial scale autoclaves. By reaction mass is meant the mixture of materials present in a reaction zone or autoclave at the termination of reaction, which mixture includes the aforementioned subdivided lead, the tetramethyllead product, alkali metal chloride, minor amounts of non-reacted chloride, and trace impurities or additives. Also present in the reaction mass, is the inert hydrocarbon customarily employed. The major component of the reaction mass is subdivided lead, owing to the above mentioned stoichiometry of the synthesis reaction. The reaction mass resembles a granular mixture and is discharged from autoclaves by rotation of agitator devices having plow elements for transport of the reaction mass to a discharge nozzle or valve. In the course of commercial operations, considerable difficulty has frequently been encountered in this respect. Another difficulty has arisen from the fact that, after using aluminum containing catalysts, apparently the reaction mass also contains a residual amount of active alkyl-aluminum component which is quite susceptible to oxidation or other reaction. This is manifested by fuming or smoking of the reaction mass when exposed to gaseous atmospheres, even when such atmospheres are relatively free of oxygen. Such a fuming necessitates the extensive use of particularly pure inert gas to partly alleviate the problem. The fuming or smoking is especially disadvantageous in that such fumes appear to deposit solids in subsequent heat exchanger equipment, which significantly fouls and reduces the capacity of such equipment. Apparently even commercial gases considered sufficiently pure to be classed "inert" included impurities of a fume initiating or inducing type.

The general object of the present invention is to provide a new and novel process for the effective and economical synthesis of tetramethyllead. Another object is to provide a catalyst system for the synthesis of tetramethyllead by the reaction of methyl chloride and sodium lead alloy, and to provide a reaction mass from a methyl chloride-sodium lead alloy reaction, which is more facile with respect to physical handling and with respect to avoidance of undesirable fumes or smoke which are disadvantageous to processing.

The process of the present invention involves reacting methyl chloride and a subdivided sodium lead alloy, usually mono-sodium lead alloy, NaPb, but not necessarily at this exact composition. The reaction is carried out in the presence of a novel catalyst system provided by introducing to the reaction system an aluminum catalyst and certain mono-oxygen ether components which function as an adjuvant or co-catalyst with the aluminum component. The aluminum catalyst may be one of a substantial number of particular materials, most of which are aluminum compounds containing at least one hydrocarbon radical, as detailed more fully hereinafter. Subdivided aluminum metal and aluminum trihalides are also quite effective. In fact, the aluminum can be provided in alloy form with another metal which may be inert in the system.

The ether compounds employed have only one ethereal oxygen, and contain a total of at least four carbon atoms, at least two carbons being in each radical attached to the ethereal oxygen. It is preferred that each radical not exceed about 12 carbon atoms, and even more preferred are radicals having not over about 8 carbon atoms. Further, each of such radicals is further defined as being selected from the group consisting of cyclo-alkylene, alkyl, aryl, vinyl and allyl radicals. These ether components include those compounds wherein different radicals are present as well as those wherein two identical radicals are present. Thus, acceptable ether compounds are alkyl-aryl ethers, or alkyl-vinyl, or alkyl-allyl ethers, or aryl-vinyl ethers. As will be illustrated herein, the term radical includes unsubstituted radicals, halogen substituted radicals and radicals with hydrocarbon radicals substituted. In the case of cyclo-alkylene radicals, the cyclic radical attaches at the terminal carbons to the ethereal oxygen, as exemplified by tetrahydrofuran.

Illustrative ethers suitable as adjuvants according to the invention are as follows:

Diethyl
Di-n-propyl
Di-n-butyl
Di-n-amyl
Di-iso-amyl
Di-isobutyl
Di-n-hexyl
Propyl-hexyl
Propyl-butyl
Tert butyl ethyl
Di-octyl
Di-decyl
Divinyl
Propyl allyl
Ethyl propyl Ethyl isopropyl
Ethyl butyl
Amyl ethyl
Amyl hexyl
Amyl phenyl
Bis($\beta$-chloroethyl)
Bis($\beta$-chloroisopropyl)
Bis(p-methyl phenyl)
p-(Methyl phenyl) ethyl
Bis(m-butyl phenyl)
Bis(p-octyl phenyl)
$\alpha$-Chloroethyl ethyl
$\beta$-Bromoethyl ethyl
$\beta$-Chloroethyl ethyl
$\alpha,\beta$-Dichloroethyl ethyl β,β-Dichloroisopropyl   Butyl phenyl
p-Butylphenyl phenyl    Isopropyl-phenyl
p-Chlorophenyl phenyl   Octyl phenyl
Anisole                 Benzyl butyl
Ethyl phenyl            Benzyl propyl As already stated, various forms of aluminum catalysts can be very effectively used. Aluminum metal, preferably in finely subdivided form, and aluminum trihalides, are probably the simplest form of aluminum catalysts. More frequently used are aluminum compounds having from one to three hydrocarbon radicals. Typical hydrocarbon aluminum compounds which are highly effective include trimethyl aluminum, triethyl aluminum, diethyl aluminum hydride, tri-n-propyl aluminum, tri-n-butyl aluminum, tri-isobutyl aluminum, di-isobutyl aluminum hydride, methyl aluminum sesquichloride, ethyl aluminum sesquichloride, diethyl aluminum chloride, ethyl aluminum dichloride, dibutyl hexyl aluminum, triphenyl aluminum, trioctyl aluminum, tridecyl aluminum, tridodecyl aluminum, di-decyl aluminum hydride, and others. It will be understood that the aluminum catalyst can be a mixture of one or more of individual components such as are enumerated above.

Batch or cyclic operating techniques are preferred for carrying out any particular embodiment of the process. In such techniques, a reaction autoclave is charged with subdivided solid sodium lead alloy, usually the monosodium lead alloy although some variation from this is permissive. Then the catalyst components are charged, usually in conjunction with a minor quantity of an inert hydrocarbon material, generally in the proportions of at least about three or four to about twenty weight percent of the lead in the alloy. The catalyst system, as already indicated, includes in all instances the aluminum catalyst and one or more of the mono oxygen ether co-catalyst components.

Several different modes of introducing the catalyst system to the reaction zone are available. A preferred mode of addition involves providing both the aluminum catalyst and the ether component in full at the beginning of the reaction, the aluminum catalyst desirably being mixed or dissolved in the inert hydrocarbon.

As already stated, the initial charge usually includes an inert hydrocarbon liquid in limited proportions. The hydrocarbon is highly beneficial in that high yields are realized at lower pressures than would be encountered in the absence of the hydrocarbon and the thermal stability of the product is improved. Preferably, the hydrocarbon is an aromatic type liquid, commercial toluene being a particularly beneficial example.

The aluminum catalyst is usually provided in proportions giving from about 0.02 to about 0.3 weight percent aluminum, based on the sodium-lead alloy used. A preferred range is 0.04 to 0.25 weight percent aluminum, an even more preferred range being from about 0.08 to 0.15 weight percent aluminum.

With respect to the ether component, its ratio to the aluminum component is not highly critical but is important. Highly effective results are obtained from about one-tenth to as high as fifteen moles per atom of aluminum in the aluminum catalyst. Lower and higher proportions can be used, with appreciably less benefit, or with no supplemental benefits, respectively. It will be appreciated that the concentrations throughout this range are in catalytic proportions, owing to the low concentrations of the aluminum catalyst. A preferred proportion of the ether component is from about one-fourth to five moles per atom of aluminum, an even more preferred range being from about one-half to three moles per gram atom.

After the above described charge, the reactor is sealed, except for necessary venting connections, the temperature is raised to, usually, 65° or above, while the system is agitated, and methyl chloride is fed. The methyl chloride in some cases is charged all at one time, and in other cases is fed in over a deliberate finite period. The total methyl chloride is provided in proportions of at least one stoichiometric requirement or theory, and usually, a substantial excess is used. It will be understood that this refers to the total quantity fed during batch operations. During portions of such cyclic operations, only minor quantities of methyl chloride may be present, when the feed is "spread out" over a finite period.

The materials thus charged together are then reacted at temperatures averaging from about 85 to 110° C. Agitation is provided throughout the reaction period, as the reacting system includes solids and volatile liquids. The reaction is continued to apparent completion, requiring at least about one hour but not over about seven hours. The exact time required is effected by the configuration of the apparatus, the degree of agitation, the quantity of alloy to be reacted, and by other factors.

On completion of the reaction, the autoclave and contents are cooled and discharged, and the tetramethyllead is recovered from the lead and alkali metal chloride components of the reaction mass. The hydrocarbon additive or minor diluent employed in the synthesis reaction is recovered concurrently with the tetramethyllead.

The present invention results in the attainment of high ultimate yields, frequently higher than normally encountered. Other benefits are also realized. For standardizing purposes, a series of "base line" operations were conducted to provide a reference for the results of the present improvement.

An autoclave was charged with 1,000 parts of comminuted monosidium lead alloy, containing 10 weight percent sodium. A mixture of an aluminum type catalyst, dissolved in anhydrous toluene was then charged, while agitating the contents of the autoclave. The said solution was provided in proportions of about 54 parts toluene by weight, and the aluminum catalyst was charged in proportions of about 0.24 weight percent aluminum content based on the alloy charged. According to the identity of the aluminum catalysts, of course, the weight of the catalyst compound would be varied. Thus, in the case of using methyl aluminum sesquichloride,

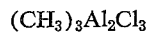

$$(CH_3)_3Al_2Cl_3$$

as the aluminum catalyst, a typical concentration was about 0.93 weight percent of the sodium lead alloy charged.

The charge thus established was then sealed in the autoclave and preheated to about 95° C., and then methyl chloride was fed to the autoclave interior. The temperature was controlled below below about 110° C., and the methyl chloride was fed during a period of less than about 30 minutes in proportions corresponding to 1.7 "theories," or about 370 parts by weight per 1000 parts of the alloy charged.

Upon completion of the reaction, after reaction for a period of approximately two hours, the contents of the autoclave were cooled and removed from the interior. The amount of tetramethyllead produced was determined by extracting from the reaction mixture, or reaction mass, with a hydrocarbon solvent, with titration of the tetramethyllead by an iodine analysis of an aliquot of the liquid extract. Alternatively, in some instances, the reaction mass was subjected to steam distillation, for separation of the tetramethyllead from the excess lead powder and sorium chloride component of the reaction mass.

A series of operations as above described was carried out, using the procedure indicated and with occasional slight variation in the amount of catalyst provided. Using triethyl aluminum as the catalyst, the average yield obtained was 77.9 percent, and when using methyl aluminum sesquichloride as catalyst in comparable concentrations, the average yield was 76.8 percent.

The reaction mass attained in the above described base line runs was quite reactive, in that, when portions were exposed to the available nitrogen gas supplied as an atmosphere, considerable smoking occurred. In addition frequent difficulty was encountered in discharging the autoclave in that the reaction mass was sticky and gummy and tended to adhere to the vessel walls and agitator.

The following working examples illustrate the present process.

*Example 1*

In this operation, the procedure as already described for the "base line" type operations was employed except that the catalyst system provided was triethyl aluminum, in proportions of about 0.46 weight percent based upon the sodium lead alloy, providing about 0.11 weight percent aluminum. Diphenyl ether was provided in proportions of 0.63 mole per atom of the aluminum in the catalyst. The feed procedure for these catalyst components was "normal," viz., the aluminum catalyst was provided in solution in toluene at the very beginning of the cycle, and the diphenyl ether was immediately added thereto.

This operation proceeded smoothly, an induction period of 35 minutes being experienced and a yield of approximately 73 percent tetramethyllead being obtained, as determined by extraction of the tetramethyllead from the reaction mass. Upon completion of the reaction, the reaction mass was relatively easy to discharge from the autoclave, and did not fume and/or smoke upon exposure to normally available nitrogen gas or a normal oxygen containing atmosphere. Thus, in this operation the presence of the diphenyl ether-triethyl aluminum catalyst system additives resulted in a significantly improved reaction mass as well as providing a good yield.

*Example 2*

The identical procedure as in Example 1 was used in this operation, except that the diphenyl ether employed was mixed with one-third of the toluene to be used, and was charged initially. Several minutes later the triethyl aluminum was provided, dissolved in the remaining toluene employed. The reaction proceeded quite smoothly and a reaction mass was obtained which was discharged easily and did not fume or smoke. The yield was lower than in Example 1, thus it is preferable to add the aluminum catalyst first.

A substantial number of additional operations have been carried out utilizing other ether compounds as adjuvants to the aluminum catalysts. The data on these operations is given by the following table:

Good yields were obtained in all the foregoing operations, ranging from about 40 to approaching 80 percent yield. Of equal importance, the reaction mass from each of the foregoing operations discharged smoothly from the autoclave and did not exhibit a fuming tendency when exposed to a gaseous atmosphere.

In all the foregoing runs, the catalyst components were added in the normal manner, with the aluminum catalyst slightly before the ether at the beginning of the run. Usually, the aluminum catalyst was dissolved in the hydrocarbon diluent.

To illustrate more fully the scope of the process, the following table gives additional examples showing further variations in the catalyst system.

| Example | Aluminum catalyst | | Ether adjuvant | | Hydrocarbon | | Catalyst system feed [1] |
|---|---|---|---|---|---|---|---|
| | Identity | Al concentration, wt. percent alloy | Identity | Moles per atom Al | Identity | Proportions, wt. percent Pb | |
| 9 | $(C_2H_5)_3Al_2Cl_3$ | 0.03 | Di-n-propyl | 13 | Xylenes | 7 | Normal. |
| 10 | $(C_2H_5)_2AlCl$ | 0.03 | p-Butyl phenyl phenyl | 12 | Toluene | 3 | Do. |
| 11 | $(iC_4H_9)_3Al$ | 0.05 | α-Chloroethyl ethyl | 14 | 2,2,3-trimethylhexane | 6 | Do. |
| 12 | $(iC_4H_9)_2AlH$ | 0.05 | Bis(m-butyl phenyl) | 5 | Naphtha, 95° | 7 | Reverse. |
| 13 | Al powder | 0.28 | α,β-Dichloroethylethyl | 1/8 | Ethyl benzene | 10 | Normal. |
| 14 | $AlCl_3$ | 0.29 | n-Amyl ethyl | 1/9 | Benzene | 7 | Do. |
| 15 | $(C_8H_{17})_3Al$ | 0.29 | Ethyl phenyl | 1.5 | Toluene | 4 | Do. |
| 16 | $(CH_3)_3Al$ | 0.09 | Divinyl | 1/4 | 1,3,5-tri-methyl benzene | 7 | Concurrent. |
| 17 | $(C_{12}H_{25})_3Al$ | 0.14 | Propyl allyl | 1/3 | Cyclohexane | 5 | Normal. |
| 18 | $(C_2H_5)_2AlH$ | 0.23 | Benzyl butyl | 2.8 | Toluene | 15 | Do. |

[1] Normal feed=aluminum component mixed with hydrocarbon and fed, followed by ether adjuvant. Reverse=at least part of ether adjuvant fed before any aluminum component, mixed with part of hydrocarbon if desired. Concurrent feed=aluminum catalyst and ether adjuvant pre-mixed with hydrocarbon.

| Example | Aluminum catalyst | | Ether catalyst | |
|---|---|---|---|---|
| | Identity | Concentration, wt. percent Al | Identity | Proportions, moles/atom Al |
| 3 | $(CH_3)_3Al_2Cl_3$ | 0.12 | Diethyl ether | 1.70 |
| 4 | $(CH_3)_3Al_2Cl_3$ | 0.25 | Anisole (methoxy benzene). | 0.82 |
| 5 | $(CH_3)_3Al_2Cl_3$ | 0.25 | Tetrahydrofuran. | 0.55 |
| 6 | $(CH_3)_3Al_2Cl_3$ | 0.25 | Di-n-butyl ether. | 0.54 |
| 7 | $(CH_3)_3Al_2Cl_3$ | 0.24 | Bis(β-chloroethyl) ether. | 0.39 |
| 8 | $(CH_3)_3Al_2Cl_3$ | 0.15 | do | 0.39 |

Having fully described the present invention and the mode of using it, what we claim is:

1. The process of manufacture of tetramethyllead comprising reacting sodium lead alloy with a methyl chloride in the presence of a catalyst system provided by adding an aluminum catalyst and an ether compound in catalytic proportions, said ether compound having only one ethereal oxygen and containing a total of at least four carbon atoms, at least two carbon atoms being in each radical attached to the ethereal oxygen, and each of such radicals being selected from the group consisting of cycloalkylene, alkyl, aryl, vinyl and allyl, said aluminum catalyst being selected from the group consisting of (1) aluminum, (2) aluminum trichloride and (3) hydrocarbon aluminum catalysts having from 1 to 3 hydrocarbon radicals and having the radicals being selected from the group consisting of hydrocarbon, chlorine, hydrogen and mixtures thereof.

2. The process of claim 1 further defined in that the aluminum catalyst is provided in proportions giving from about 0.02 to about 0.3 weight percent aluminum based on the sodium lead alloy and the ether component is in the proportions of from about one-tenth to 15 moles per atom of aluminum.

3. The process of claim 2 further defined in that the aluminum catalyst is a compound having at least one hydrocarbon radical per aluminum atom.

4. The process of claim 3 further defined in that the ether component of the catalyst system is a dialkyl ether.

5. The process of claim 4 further defined in that the dialkyl ether is bis(β-chloroethyl) ether.

6. The process of claim 3 further defined in that the ether component is a diaryl ether.

7. The process of claim 6 further defined in that the diaryl ether is diphenyl ether.

8. The process of claim 3 further defined in that the ether is an alkyl aryl ether.

9. The process of claim 8 further defined in that the alkyl aryl ether is anisole.

10. The process of claim 3 further defined in that the ether is a cycloalkylene ether.

11. The process of claim 10 further defined in that the cycloalkylene ether is tetrahydrofuran.

12. As a new composition a reaction mass derived from the reaction of a sodium lead alloy and methyl chloride in the presence of a catalyst system provided by adding to the reaction an aluminum catalyst and an adjuvant ether compound having only one ethereal oxygen, said ether containing a total of at least four carbon atoms, at least two carbon atoms being in each radical attached to the ethereal oxygen and each of said radicals being selected from the group consisting of cycloalkylene, alkyl, aryl, vinyl and allyl radicals, said reaction mass being characterized by relative facility of movement and the absence of smoking and fuming in the presence of a gas containing smoke initiating component, said aluminum catalyst being selected from the group consisting of (1) aluminum, (2) aluminum trichloride and (3) hydrocarbon aluminum catalysts having from 1 to 3 hydrocarbon radicals and having the radicals being selected from the group consisting of hydrocarbon, chlorine, hydrogen and mixtures thereof.

13. The process of manufacture of tetramethyllead comprising reacting sodium lead alloy with a methyl chloride in the presence of a catalyst system provided by adding methyl aluminum sesquichloride and an ether compound in catalytic proportions, said ether compound having only one ethereal oxygen and containing a total of at least four carbon atoms, at least two carbon atoms being in each radical attached to the ethereal oxygen, and each of such radicals being selected from the group consisting of cycloalkylene, alkyl, aryl, vinyl and allyl.

References Cited by the Examiner
UNITED STATES PATENTS

| | | | |
|---|---|---|---|
| 2,905,646 | 9/1959 | Natta et al. | 252—431 |
| 2,989,487 | 6/1961 | Truett | 252—431 |
| 3,052,702 | 9/1962 | Robinson | 260—437 |
| 3,072,694 | 1/1963 | Tullio | 260—437 |
| 3,072,695 | 1/1963 | Tullio | 260—437 |

TOBIAS E. LEVOW, *Primary Examiner.*